United States Patent
Hyllus et al.

(10) Patent No.: US 9,792,719 B2
(45) Date of Patent: Oct. 17, 2017

(54) METHOD AND APPARATUS FOR REMOVING OUTLIERS FROM A MAIN VIEW OF A SCENE DURING 3D SCENE RECONSTRUCTION

(71) Applicant: THOMSON LICENSING, Issy les Moulineaux (FR)

(72) Inventors: Philipp Hyllus, Hannover (DE); Xavier Good, Bussigny (CH); Markus Schlosser, Karlsruhe (DE); Joern Jachalsky, Wennigsen (DE); Ralf Ostermann, Hannover (DE)

(73) Assignee: THOMSON LICENSING, Issy-les-Moulineaux (FR)

( * ) Notice: Subject to any disclaimer, the term of this patent is extended or adjusted under 35 U.S.C. 154(b) by 111 days.

(21) Appl. No.: 14/929,325

(22) Filed: Oct. 31, 2015

(65) Prior Publication Data
US 2016/0125637 A1    May 5, 2016

(30) Foreign Application Priority Data
Oct. 31, 2014  (EP) .................................. 14306750

(51) Int. Cl.
*G06T 15/00*  (2011.01)
*G06T 17/00*  (2006.01)
*G06T 7/30*  (2017.01)

(52) U.S. Cl.
CPC .............. *G06T 15/005* (2013.01); *G06T 7/30* (2017.01); *G06T 17/00* (2013.01); *G06T 2207/10028* (2013.01)

(58) Field of Classification Search
CPC ......... G06T 15/005; G06T 7/30; G06T 17/00; G06T 2207/10028
USPC ........................................................ 382/154
See application file for complete search history.

(56) References Cited

U.S. PATENT DOCUMENTS

| | | | |
|---|---|---|---|
| 6,363,170 | B1 | 3/2002 | Seitz et al. |
| 6,990,228 | B1 | 1/2006 | Wiles et al. |
| 7,292,735 | B2 | 11/2007 | Blake et al. |
| 7,315,643 | B2 | 1/2008 | Sakamoto et al. |

(Continued)

FOREIGN PATENT DOCUMENTS

| | | |
|---|---|---|
| KR | 1020080051015 | 6/2008 |
| WO | WO2013062944 | 5/2013 |

OTHER PUBLICATIONS

Atzpadin et al.: "Stereo Analysis by Hybrid Recursive Matching for Real-Time Immersive Video Conferencing"; IEEE Transactions on Circuits and Systems for Video Technology, vol. 14 (2004), pp. 321-334; published Mar. 2004.

(Continued)

*Primary Examiner* — Amandeep Saini
(74) *Attorney, Agent, or Firm* — Tutunjian Bitetto, P.C.

(57) ABSTRACT

A method and an apparatus for removing outliers from a main view of a scene during 3D reconstruction of a scene from multiple views of the scene. A 3D projection unit projects a 3D point of a pixel of the main view into neighboring views. A comparator then compares the distance of each of the projected 3D points in the neighboring views to the 3D point of the main view with a defined distance threshold. Based on the comparison a flagging unit assigns flags to the pixel in the main view. Finally, depending on values of the flags a rejecting unit rejects the pixel in the main view as an outlier.

44 Claims, 9 Drawing Sheets

(56) References Cited

U.S. PATENT DOCUMENTS

| | | | |
|---|---|---|---|
| 7,379,584 B2 | 5/2008 | Rubbert et al. | |
| 8,588,515 B2 | 11/2013 | Bang et al. | |
| 2012/0098932 A1 | 4/2012 | Kim et al. | |
| 2013/0027523 A1 | 1/2013 | Girdzijauskas et al. | |
| 2013/0106849 A1* | 5/2013 | Ha | G06T 5/005 345/420 |

OTHER PUBLICATIONS

Bleyer et al.: "PatchMatch Stereo—Stereo Matching with Slanted Support Windows"; Proceedings of the British Machine Vision Conference (BMVC) (2011), pp. 1-11; published Aug. 29, 2011.

Campbell et al.: "Using Multiple Hypotheses To Improve Depth-Maps for Multiview Stereo"; published Oct. 20, 2008; pp. 1-13.

Anonymous: "Dense multi-view stereo test images"; cvlabwww.epfl.ch_data_multiview_denseMVS.html; Retrieved from Internet: Sep. 30, 2014; pp. 1-2.

Gallup et al.: "Variable Baseline Resolution Stereo"; IEEE Conference on Computer Vision and Pattern Recognition (CVPR)(2008), pp. 1-8; published Jun. 23, 2008.

Hu et al.: "Least Commitment, Viewpoint-based, Multi-view Stereo"; Proceedings of the 2012 Second International Conference on 3D Imaging, Modeling, Processing, Visualization & Transmission (3DIMPVT) (2012), pp. 531-538; published Oct. 13, 2012.

Kang et al: "Handling Occlusions In Dense Multi-View Stereo"; Proceedings of the 2001 IEEE Computer Society Conference on Computer Vision and Pattern Recognition. CVPR 2001; published Dec. 8, 2001; pp. 1-8.

Liu et al.: "A Point-Cloud-Based Multiview Stereo Algorithm for Free-Viewpoint Video"; IEEE Transactions on Visualization and Computer Graphics | 16 (3): 407-418 May-Jun. 2010.

Merrell et al.: "Real-Time Visibility-Based Fusion of Depth Maps"; IEEE 11th International Conference on Computer Vision (ICCV) (2007), pp. 1-8; published Oct. 14, 2007.

Shen: "Depth-Map Merging for Multi-View Stereo with High Resolution Images"; 21st International Conference on Pattern Recognition (ICPR) (2012), pp. 788-791; published Nov. 11, 2012 .

Strecha et al.: "On Benchmarking Camera Calibration and Multi-View Stereo for High Resolution Imagery"; IEEE Conference on Computer Vision and Pattern Recognition (CVPR) (2008), pp. 1-8; published Jun. 23, 2008.

Szeliski: "A Multi-View Approach to Motion and Stereo"; Proceedings. 1999 IEEE Computer Society Conference on Computer Vision and Pattern Recognition (Cat. No. PR00149); published Jun. 23, 1999; pp. 1-7.

Tola et al.: "Efficient large-scale multi-view stereo for ultra-high resolution image sets"; Machine Vision and Applications vol. 23 (2012), pp. 903-920; published Sep. 2012.

Cheng et al.: "Spatio-Temporally Consistent Novel View Synthesis Algorithm From Video-Plus-Depth Sequences for Autostereoscopic Displays"; IEEE Transactions on Broadcasting | 57 (2): pp. 523-532; published Jun. 2011.

Search Report Dated: Jul. 1, 2015.

* cited by examiner

METHOD AND APPARATUS FOR REMOVING OUTLIERS FROM A MAIN VIEW OF A SCENE DURING 3D SCENE RECONSTRUCTION

This application claims the benefit, under 35 U.S.C. §119 of European Patent Application No. 14306750.2, filed Oct. 31, 2014.

FIELD OF THE INVENTION

The invention relates to a method and an apparatus for 3D scene reconstruction. In particular, the invention relates to a method and an apparatus for removing outliers from a main view of a scene during 3D reconstruction of a scene from multiple views of the scene.

BACKGROUND OF THE INVENTION

In order to reconstruct a 3D scene from a stereo-video sequence it is necessary know the underlying camera poses and camera parameters. They can be obtained, for example, with the help of a structure from motion (SFM) algorithm. The problem of creating a dense model from this information and the available images is generally referred to as multi-view stereo (MVS).

Consider the simplest case of two images of a static scene taken by two cameras with known camera poses and camera parameters, i.e. a stereo-frame. From this data a dense model can be created as follows. The light from a 3D point in the scene hits the two camera sensors at different locations. If these locations are known, the depth of the point can be computed by triangulation. The process of finding such a pixel correspondence is referred to as disparity estimation. Applying this principle to all pixels leads to a dense 3D point cloud. In the following, one image together with the camera pose and parameters and the depth information are referred to as a "view". Note that the depth estimates of a view need not necessarily be derived from a stereo frame, but could also be obtained from a time-of-flight sensor or a structured-light sensor, for example.

Typically, work in this field focuses on the 3D reconstruction from a video sequence of a single camera or from several still images. The 3D reconstruction from a video-sequence of stereo images has, so far, not received much attention. Here, the relative pose of the two cameras comprising the stereo camera is fixed. The relative pose can be precisely estimated together with the camera parameters in a calibration phase. Therefore, for each stereo-image, depth estimates can be computed without errors stemming from the pose estimation. However, the disparity estimation process is prone to produce errors. In addition, the pose of the stereo-camera for different times still needs to be estimated.

A problem in 3D reconstruction are outliers among the views. Few authors have considered this problem. Simple approaches were proposed by E. Tola et al.: "*Efficient large-scale multi-view stereo for ultra-high resolution image sets*", Machine Vision and Applications Vol. 23 (2012), pp. 903-920, and S. Shen: "*Depth-Map Merging for Multi-View Stereo with High Resolution Images*", 21st International Conference on Pattern Recognition (ICPR) (2012), pp. 788-791. In both publications each 3D point from a main view is projected into each of N neighboring views. In each neighboring view, this yields a pixel location. From the depth information recorded for such a pixel, another 3D point is obtained. If the distance to the original 3D point relative to the depth of the pixel in the neighboring view is below some threshold, the neighboring view is considered to be in agreement with the main view.

The depth information of the corresponding pixel in the main view is kept if there is agreement for $n \geq \delta$ neighboring views, where $\delta$ is a free parameter. This approach does not distinguish between conflicts and possible occlusions. If $\delta < N$, depth estimates may be kept when there is no agreement due to an occlusion, but also if there is strongly contradicting information from one or more side views. Furthermore, it is questionable whether or not the distance computed relative to a depth is the best measure for the comparison.

A further related publication is P. Merrell et al.: "*Real-Time Visibility-Based Fusion of Depth Maps*", IEEE 11th International Conference on Computer Vision (ICCV) (2007), pp. 1-8. In this publication the authors also consider one main view and N neighboring views, and two algorithms are presented for improving the depth estimates of the main view. In contrast to the previous works, they first project all pixels from the N neighboring views into the main view, leading to several depth estimates for each pixel of the main view. Both algorithms compute a new depth estimate from this information.

In the first approach, for each pixel of the main view, the algorithm starts with the smallest depth estimate and evaluates a stability function related to occlusions and free-space-violations of the corresponding 3D point. For finding free-space violations, the 3D point related to the current depth hypothesis needs to be projected into all N neighboring views. The underlying idea of the stability function is that a free space violation suggests that the depth of the pixel of the main view is underestimated, while an occlusion suggests that it is overestimated. The depth of a pixel is called stable when there is as much evidence that the depth is overestimated as for it being underestimated. The minimal stable depth hypothesis is chosen, and support for it is computed from the confidence of depth estimates which agree with it. Here agreement is based on the relative distance as above.

In the second approach a depth estimate is fused with all depth estimates agreeing with it. The confidence is the sum of the confidences of all agreeing depth estimates minus the confidences of the conflicting ones.

This second approach was extended recently in X. Hu et al.: "*Least Commitment, Viewpoint-based, Multi-view Stereo*", Proceedings of the 2012 Second International Conference on 3D Imaging, Modeling, Processing, Visualization & Transmission (3DIMPVT) (2012), pp. 531-538. The author considered the possibility of having more than one depth estimate per pixel in the main view and defined agreement not based on the relative distance as above but on the geometrical uncertainty of each depth estimate.

A problem of the first algorithm is that it is questionable whether or not free space violations and occlusions really indicate the under- and overestimation of the original pixel's depth. Furthermore, a depth might be called stable even when there are strong conflicts with respect to some neighboring views. A disadvantage of both algorithms is that the collection of all pixels from the neighboring views which project into the same pixel in the main view is computationally much more demanding than projecting from the main view into the neighboring views. Also, in contrast to the approaches of E. Tola et al. and Shen, generally many more (up to $N^2$) than N projections from one view into another one are required, which are computationally costly.

SUMMARY OF THE INVENTION

It is an object of the present invention to propose an improved solution for removing outliers from a main view of a scene during 3D reconstruction of a scene from multiple views of the scene.

According to the invention, a method for removing outliers from a main view of a scene during 3D reconstruction of a scene from multiple views of the scene comprises:
  projecting a 3D point of a pixel of the main view into neighboring views;
  comparing the distance of each of the projected 3D points in the neighboring views to the 3D point of the main view with a defined distance threshold;
  assigning flags to the pixel in the main view based on the comparison; and
  rejecting the pixel in the main view as an outlier depending on values of the flags.

Accordingly, a computer readable storage medium has stored therein instructions enabling removing outliers from a main view of a scene during 3D reconstruction of a scene from multiple views of the scene, which, when executed by a computer, cause the computer to:
  project a 3D point of a pixel of the main view into neighboring views;
  compare the distance of each of the projected 3D points in the neighboring views to the 3D point of the main view with a defined distance threshold;
  assign flags to the pixel in the main view based on the comparison; and
  reject the pixel in the main view as an outlier depending on values of the flags.

Also, in one embodiment an apparatus configured to remove outliers from a main view of a scene during 3D reconstruction of a scene from multiple views of the scene comprises:
  a 3D projection unit configured to project a 3D point of a pixel of the main view into neighboring views;
  a comparator configured to compare the distance of each of the projected 3D points in the neighboring views to the 3D point of the main view with a defined distance threshold;
  a flagging unit configured to assign flags to the pixel in the main view based on the comparison; and
  a rejecting unit configured to reject the pixel in the main view as an outlier depending on values of the flags.

In another embodiment, an apparatus configured to remove outliers from a main view of a scene during 3D reconstruction of a scene from multiple views of the scene comprises a processing device and a memory device having stored therein instructions, which, when executed by the processing device, cause the apparatus to:
  project a 3D point of a pixel of the main view into neighboring views;
  compare the distance of each of the projected 3D points in the neighboring views with the 3D point of the main view with a defined distance threshold;
  assign flags to the pixel in the main view based on the comparison; and
  reject the pixel in the main view as an outlier depending on values of the flags.

The 3D reconstruction from a large set of views is considered. These views are, for example, obtained from a stereo-video sequence. Outliers are removed from a main view by projecting the 3D points of the main view into N neighboring views. Information on the spatial consistency from several neighboring views is consistently combined, properly taking into account occlusions and conflicts. To this end the distance of each of the corresponding 3D points in the neighboring views to the 3D point of the main view are compared with a defined distance threshold. The proposed solution will generally reject more pixels than prior art solutions, as it disposes of nearly all bad depth estimates. However, since in this setting there is an abundance of data, it is sufficient to keep only very reliable 3D points. Agreement of 3D points is judged based on the absolute distance, which is a stricter agreement criterion than that based on the relative distance because it does not get weaker with increasing depth. As a result, a fixed spatial precision is obtained.

In one embodiment, a flag with a first value is assigned when the 3D point in the main view and a projected 3D point in a neighboring view are in agreement, a flag with a second value is assigned when a conflict exists between the 3D point in the main view and a projected 3D point in a neighboring view, and a flag with a third value is assigned when the comparison cannot be performed or when a clear decision cannot be made. For the comparison of a 3D point of the main view with a single neighboring view, several flags are used. In addition to the flags "good" for agreement and "bad" for a conflict a flag "undecided" is introduced. The 3D point of a neighboring view is considered to be in agreement with that of the main view if their distance is below a defined distance threshold. If the distance exceeds the threshold, and the 3D point of the main view is closer to the camera center of the neighboring view than the 3D point seen by the neighboring view, this is a clear conflict, and the "bad" flag is assigned. The flag "undecided" summarizes several cases. One case is that no depth information is available for a pixel in a neighboring view hit by projecting the 3D point of the pixel of the main view. Another case is that projecting the 3D point of the pixel of the main view into a neighboring view does not hit the neighboring view. Yet another case is that a deviation of the distances might be due to an occlusion, i.e. the distance threshold is exceeded, but the 3D point seen by the neighboring view is closer to its camera center than the 3D point of the main view. The above described situations are illustrated in FIG. 2.

In one embodiment, the pixel in the main view is rejected as an outlier if the number of flags with the second value is above a conflict threshold or if the number of flags with the first value is below an agreement threshold. In other words, a pixel of the main view is rejected if there are too many "bad" results or not enough "good" results. In this way pixels for which strictly contradicting information is given from the comparison with a neighboring view are reliably rejected.

In one embodiment, the flag with the third value is changed to a flag with the second value when the distance is above the defined distance threshold but below a sum of depth errors of the pixel in the main view and the pixel in the neighboring view hit by projecting the 3D point of the pixel of the main view. For judging whether or not occlusion is present, a further distance threshold based on the depth estimation error is used. If the distance is in between the two thresholds, the precision requirement is violated, but taking into account the error of the disparity estimation, the true depth of the 3D point in the main view may actually be smaller than that of the 3D point in the neighboring view. Hence in this situation it is not safe to judge that an occlusion is present.

In one embodiment, an additional consistency check is performed when a flag with the first value is assigned to the pixel. The flag with the first value is then changed to a flag with the second value when the additional consistency check fails. It has been found that it can happen that a disparity estimator consistently misjudges the depth structure of local details of the scene, even for different views. This means that a 3D point estimated by the main view is spatially consistent with the corresponding 3D point estimated by a neighboring view, even though the views do not see the same 3D point in the scene. In block-matching algorithms, for instance, this can happen for objects which are of a similar or a smaller size in the images as the blocks used for the disparity estimation. The additional check is used to detect bad depth estimates, which cannot be detected by spatial consistency checks in the presence of systematically wrong depth estimates produced by typical disparity estimators. The check is simple and fast because the computationally costly 3D projections from the main view into the neighboring views have already been carried out for the spatial consistency checks.

In one embodiment, the additional consistency check compares a property of the pixel in the main view and a property of the pixel in the neighboring view hit by projecting the 3D point of the pixel of the main view. If the two views are really seeing the same 3D point, any other information obtained for that point from the two views should agree as well. For instance, the image intensity or the color of the pixel could be compared to that of the pixel hit in the neighboring view. Alternatively, an intensity averaged for a window around the pixel or a color averaged for a window around the pixel can be compared. This allows handling luminosity changes that may occur due to specular surfaces when the two images were taken at a larger distance of the cameras, even though the same camera was used.

In one embodiment, the additional consistency check uses a normalized cross-correlation between a window centered at the pixel in the main view and a window centered at the pixel in the neighboring view hit by projecting the 3D point of the pixel of the main view. This approach further increases the robustness with respect to luminosity changes as well as to image sensor noise.

In one embodiment, in case of a sequence of views, the sequence is divided into distinct subsets, wherein for each subset one view is selected as a main view, whereas the remaining views are selected as neighboring views. Alternatively, a view of the sequence serves as a main view, but also as a neighboring view for another view of the sequence. As the proposed solution allows using every view not only as a main view, which is cleaned, but also as a neighboring view, it is ideally suited for sequences of views.

The proposed approach is formulated for views without considering the origin of the depth information. It is hence not only suitable for a video-sequence of stereo-images. The results could be applied to any dataset where a sequence of images with depth information is available, e.g. a monocular video-sequence or a collection of images.

DETAILED DESCRIPTION OF PREFERRED EMBODIMENTS

For a better understanding the invention shall now be explained in more detail in the following description with reference to the figures. It is understood that the invention is not limited to these exemplary embodiments and that specified features can also expediently be combined and/or modified without departing from the scope of the present invention as defined in the appended claims.

As already indicated above, the proposed approach aims at removing outliers of a view of a stereo-sequence through the comparison with N neighboring views.

Figure 1:
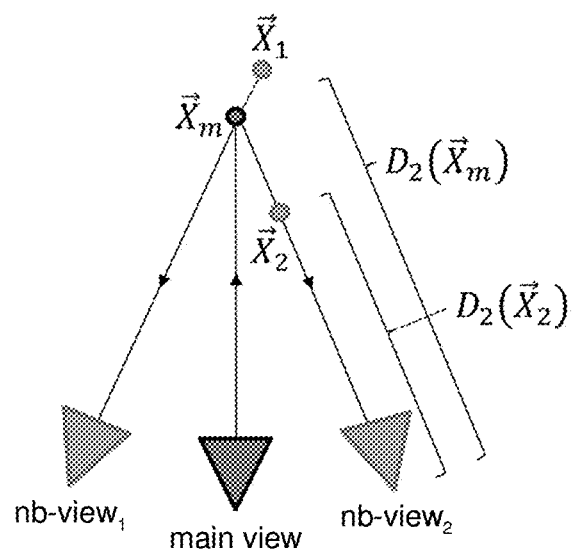
FIG. 1 illustrates a simple situation of a main view and two neighboring views.

Considering a moving stereo-camera, one can usually choose a neighborhood of views on both sides of a main view by considering views at slightly earlier and slightly later time instances. In this case, objects which are occluded from one side are typically not occluded from the other side. The simplest situation of this type is depicted in FIG. 1. Note, however, that the present approach is applicable to other situations as well, even when there is only a single neighboring view, for instance. In FIG. 1 each triangle represents a view as defined in the background section, where "nb-view" refers to a neighboring view. The 3D point $\vec{X}_m$ for a pixel from the main view is projected into the two neighboring views. From the depths of the pixels hit there, the 3D points $\vec{X}_1$ and $\vec{X}_2$ are computed. The distance of a 3D point with respect to the camera center of the nb-view i is denoted by $D_i$.

In the following a comparison with a single side view shall be discussed first.

Two 3D points are considered to be in agreement if $$|D_i(\vec{X}_m)-D_i(\vec{X}_i)|\leq\delta_{dist},$$

where $\delta_{dist}$ is a free parameter.

Figure 2:
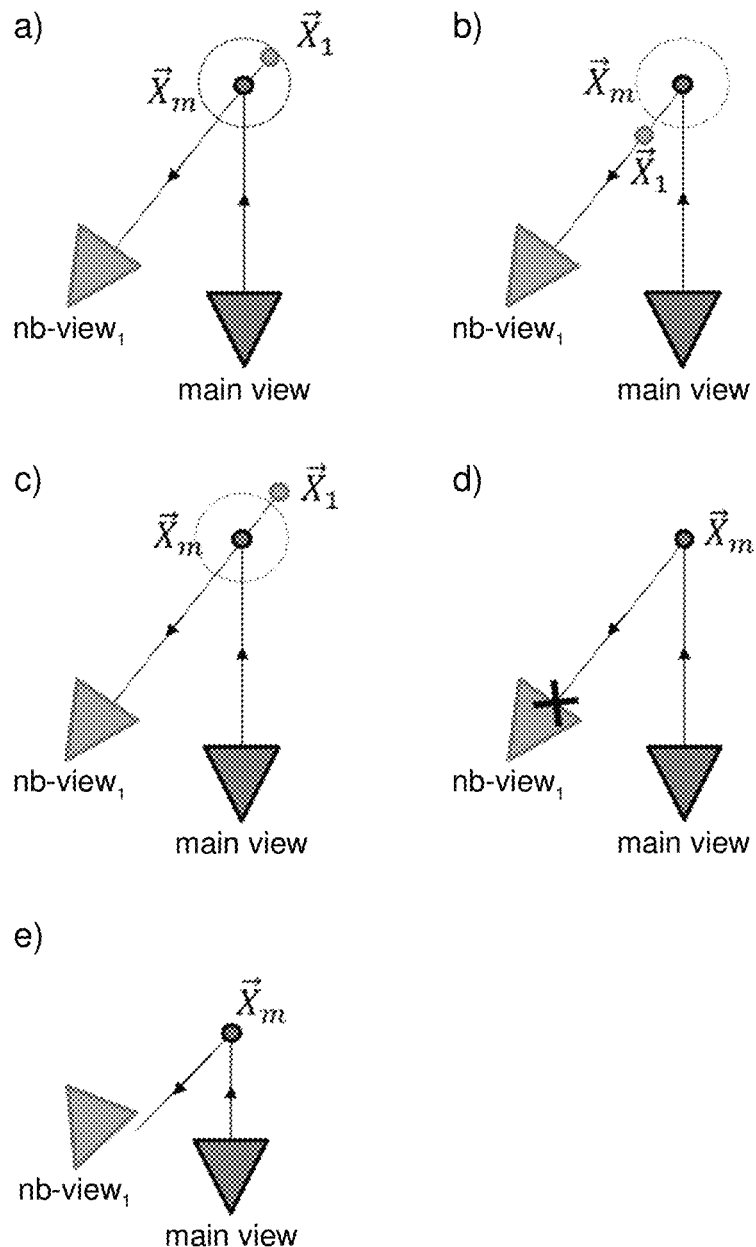
FIG. 2 shows possible situations when a 3D point from a main view is re-projected into a neighboring view.

For each pixel of the main view, one of five different results is obtained from the comparison with one neighboring view which are illustrated in FIG. 2. The circles around the 3D point $\vec{X}_m$ depict the distance bound $\delta_{dist}$. If $\vec{X}_m$ and $\vec{X}_i$ are in agreement, the corresponding pixel of the main view is flagged as "good" (FIG. 2*a*)). If the distance bound is violated, then the pixel is flagged either as "bad" if there is a clear contradiction (FIG. 2*c*)) or as "occluded" if the deviation might be due to an occlusion (FIG. 2*b*)), i.e. there might be some object preventing the neighboring view from seeing the 3D point $\vec{X}_m$.

A pixel is flagged as "no depth" if there is no depth information at the pixel hit in the neighboring view (FIG. 2*d*)). Introducing this flag is useful mainly because of two reasons. Firstly, the disparity estimator may judge that a depth estimate is unreliable, or secondly, the neighboring view may have been cleaned already in an iterative strategy, and the pixel's depth may have been rejected as unreliable at this stage. This will be explained later during the discussion of iterative strategies. Finally, a pixel is flagged as "out" if the re-projection does not hit the neighboring view (FIG. 2*e*)).

The results "occluded", "no depth", and "out" are all preferably collected under the general flag "undecided".

The depth error for a pixel may be estimated as $$\Delta D = \frac{D^2}{fb}\Delta d,$$

where D is the depth, f is the focal length and b the baseline of the stereo frame, and $\Delta d$ is the disparity estimation uncertainty. See, for instance, D. Gallup et al.: "*Variable Baseline/Resolution Stereo*", IEEE Conference on Computer Vision and Pattern Recognition (CVPR) (2008), pp. 1-8. The uncertainty $\Delta d$ may be used as a free parameter here.

Figure 3:
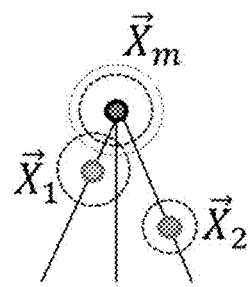
FIG. 3 illustrates post-processing of occluded pixels taking into account depth estimation errors.

In situations where the distance threshold $\delta_{dist}$ is smaller than the sum of the depth errors $\Delta D_m + \Delta D_i$ of the main view and the neighboring view i, it is beneficial to change "occluded" to "bad" if the condition $$\delta_{dist} < |D_i(\vec{X}_m)-D_i(\vec{X}_i)|\leq\Delta D_m+\Delta D_i$$

is fulfilled. Note that the second distance bound depends on the estimated error $\Delta d$ of the disparity estimation. This situation is illustrated in FIG. 3, where the thin circle around $\vec{X}_m$ depicts the distance threshold $\delta_{dist}$. The thicker circles have a radius corresponding to the estimated depth error $\Delta D$. Here, $\vec{X}_2$ is far enough away so that the original pixel receives the flag "occluded" from the comparison with the neighboring view 2, while $\vec{X}_1$ is so close that the original pixel is flagged "bad" from the comparison with view 1.

The motivation is that if the distance is in between the two thresholds, the precision requirement is violated, but taking into account the error of the disparity estimation, the true depth of $\vec{X}_m$ may actually be smaller than that of $\vec{X}_i$. Hence in this situation it is not safe to judge that an occlusion is present. Note that strictly speaking, the depth error is valid only in the direction of the pixel-ray, but it is also used for the other directions for simplicity.

In a similar way, one may argue that a "bad" flag should be changed into an "undecided" flag. This possibility is not considered here, because the proposed approach aims at getting rid of all bad estimates.

After the comparison with the N neighboring views, there are N flags for every pixel. Each flag is "good", "bad", or "undecided". According to the proposed approach a pixel is rejected if the number of "bad" flags is above a threshold $\delta_{bad}$ or if the number of "good" flags is below a threshold $\delta_{good}$. Note that the "undecided" flag allows to keep occluded pixels. Generally, a small $\delta_{bad}$ will be chosen in order to take into account contradictions properly. Note that in this way also bad depth estimates may be removed before they are used for a comparison with another view in an iterative strategy, as will be described later. However, introducing the possibility of keeping a pixel although there are contradicting results is useful for a larger N because the contradictions may be due to faulty disparity estimates in the neighboring views, not in the main view.

It sometimes happens that a disparity estimator misjudges the depth and hence the 3D point in such a way that the bad estimate is consistent with the estimated 3D point from different viewpoints. For block-matching algorithms, for instance, this can happen when the object as seen in the image is of a similar size as the window size used for the disparity estimation.

This situation can be detected by performing additional consistency checks using other information channels for the pixels with "good" spatial consistency. This may turn a "good" flag into a "bad" flag. One may compare direct image information such as pixel intensities or colors. Alternatively, additional information from the image neighborhoods of the pixels can be processed to compute the normalized cross-correlation (NCC), for instance. Of course, any other information could be compared as well, such as, for instance, normal vectors of the estimated surface, which some disparity estimators provide.

Figure 4:
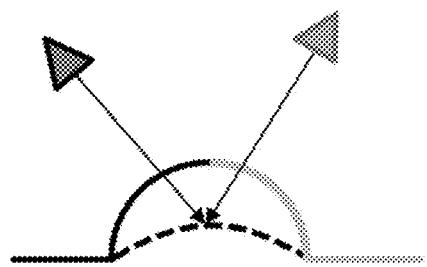
FIG. 4 explains the situation of falsely estimated "good" pixels.

If the additional test is passed, a "good" flag remains "good". If it fails, it is changed to "bad". The situation is illustrated in FIG. 4. In this figure the true surface is the bold line. The surface which is falsely estimated by both the main view as well as the neighboring view is the dashed line. This can happen when the size of the object in the images is comparable to or smaller than the window size of the block matching algorithm. In this case it can happen that the estimated depth of the part where the object is planar is interpolated with the estimated depth of the part where it is curved, so that the protruding object is estimated as being less protruding than it actually is. Since the two views see different parts of the surface, the secondary test can help to detect the false depth estimates. In the illustration, the intensity seen from the left view is black while the one seen by the right view is light grey.

Three examples of the additional test shall be discussed in the following.

The simplest possibility is to compare the intensities of the pixels and call a pixel $\vec{p}_m$ of the main view consistent with neighboring view i if $$|I_i(\vec{p}_i)-I_m(\vec{p}_m)|\leq\delta_{int},$$

where $I_x(\vec{p}_x)$ is the intensity of the image at the pixel location $\vec{p}_x$ for the image x, where x=i refers to the neighboring view and x=m refers to the main view. The threshold $\delta_{int}$ is a free parameter. Since a moving camera is considered, such a test is already sufficient if the neighboring image was recorded at a close-by instant in time, as in this situation the camera centers are close and the viewing directions are similar.

When the two images were taken at a larger distance of the cameras, then luminosity changes may occur due to specular surfaces even though the same camera was used. In such a situation it is beneficial to apply the test $$|\tilde{I}_i(\vec{p}_i) - \tilde{I}_m(\vec{p}_m)| \leq \delta_{int}$$

instead, where $\tilde{I}_x(\vec{p}_x) = I_x(\vec{p}_x) - \bar{I}_x(\vec{p}_x)$ and $\bar{I}_x(\vec{p}_x)$ is the average or median intensity for a window around the pixel $\vec{p}_x$, for x=i, m.

The robustness with respect to luminosity changes as well as to image sensor noise can be further increased by computing the normalized cross-correlation (NCC)

$$NCC(\vec{p}_i, \vec{p}_m) = \frac{\Sigma_j [I_i(\vec{p}_i + \vec{d}_j) - \bar{I}_i(\vec{p}_i)][I_m(\vec{p}_m + \vec{d}_j) - \bar{I}_m(\vec{p}_m)]}{\sqrt{\Sigma_j [I_i(\vec{p}_i + \vec{d}_j) - \bar{I}_i(\vec{p}_i)]^2} \sqrt{\Sigma_j [I_m(\vec{p}_m + \vec{d}_j) - \bar{I}_m(\vec{p}_m)]^2}},$$

where the set of displacements $\vec{d}_j$ are such that windows centered at the pixels $\vec{p}_i$ and $\vec{p}_m$ are used in the computation. The NCC takes values in between −1 and 1. It is close to 1 if the two patches agree well. Hence one can call a pixel's depth estimate consistent with the neighboring view i if $$E_{NCC}(\vec{p}_i, \vec{p}_m) \geq \delta_{NCC},$$

where $\delta_{NCC}$ is a free parameter.

A further improvement can be achieved by projecting the window from the main view into the neighboring view to properly take slanted surfaces into account.

The proposed approaches were tested using the Fountain dataset presented in C. Strecha et al.: "*On Benchmarking Camera Calibration and Multi-View Stereo for High Resolution Imagery*", IEEE Conference on Computer Vision and Pattern Recognition (CVPR) (2008), pp. 1-8. This comprises a set of eleven images of a static scene from different angles together with the camera poses as well as a 3D model obtained with a laser scanner. The latter served as ground truth for evaluating the test results.

Figure 5:
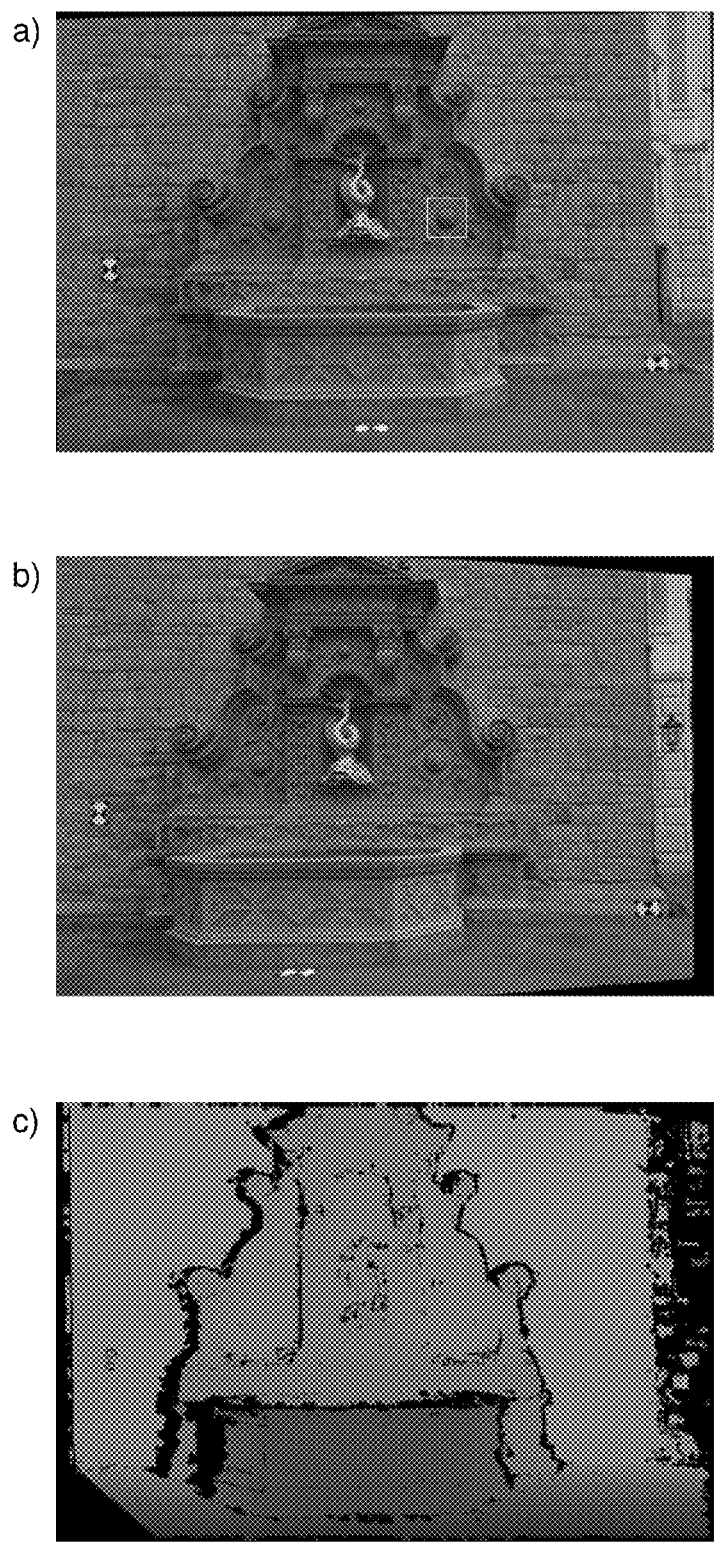
FIG. 5 shows the left image and the right image for a main stereo frame as well as depths computed for the left image.

Pairs of images were grouped to form stereo frames for testing purposes. For the results presented here, the setting of FIG. 1 was considered, where the main stereo frame comprised the images (5,4) and the neighboring stereo frames were made from the pairs (3,2) and (7,6). For each stereo-pair a disparity estimator was applied, which was developed based on the methods from N. Atzpadin et al.: "*Stereo Analysis by Hybrid Recursive Matching for Real-Time Immersive Video Conferencing*", IEEE Transactions on Circuits and Systems for Video Technology, Vol. 14 (2004), pp. 321-334, and M. Bleyer et al.: "*PatchMatch Stereo—Stereo Matching with Slanted Support Windows*", Proceedings of the British Machine Vision Conference (BMVC) (2011), pp. 1-11. It was chosen to form a view by the left images and the related depth map, see FIG. 5. In this way a central main view and N=2 neighboring views on both sides of the main view were obtained, as considered in FIG. 1. FIG. 5*a*) shows the left image, FIG. 5*b*) the right image for the main stereo frame taken from the Fountain dataset. Depths were computed for the left image. They are illustrated in FIG. 5*c*). If a pixel is black in FIG. 5*c*) then no reliable depth information was obtained by the disparity estimator. In the notation of the present description, FIG. 5*a*) and FIG. 5*c*) form a view. The disparity estimation was performed on downscaled images of size 768×512. The situation described with reference to FIG. 4 occurs, for example, for the protruding small round ornament on the fountain marked in FIG. 5*a*).

Figure 6:
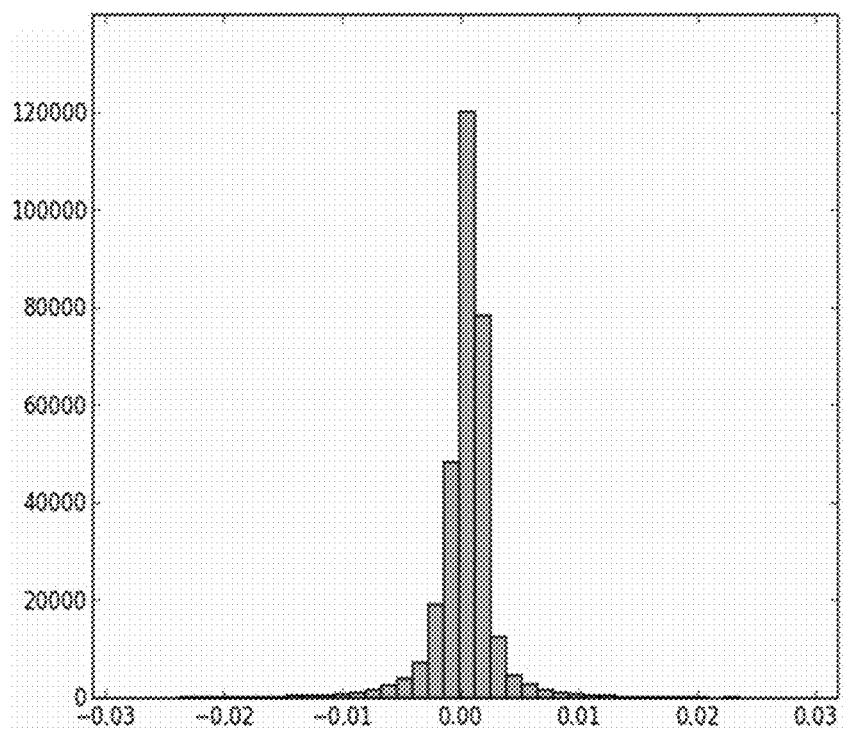
FIG. 6 depicts a histogram of relative deviations of the estimated 3D point cloud from the ground truth.
Figure 7:
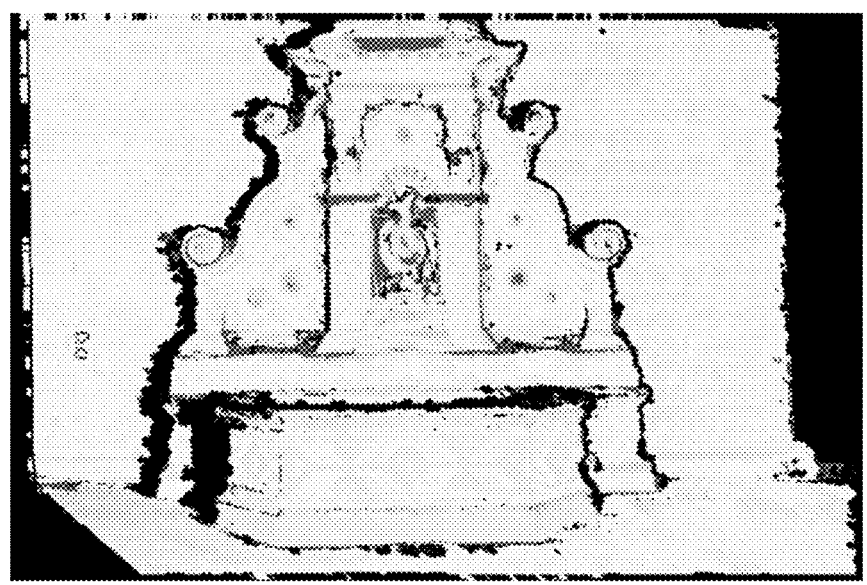
FIG. 7 shows a grey value visualization of the relative deviations.
Figure 8:
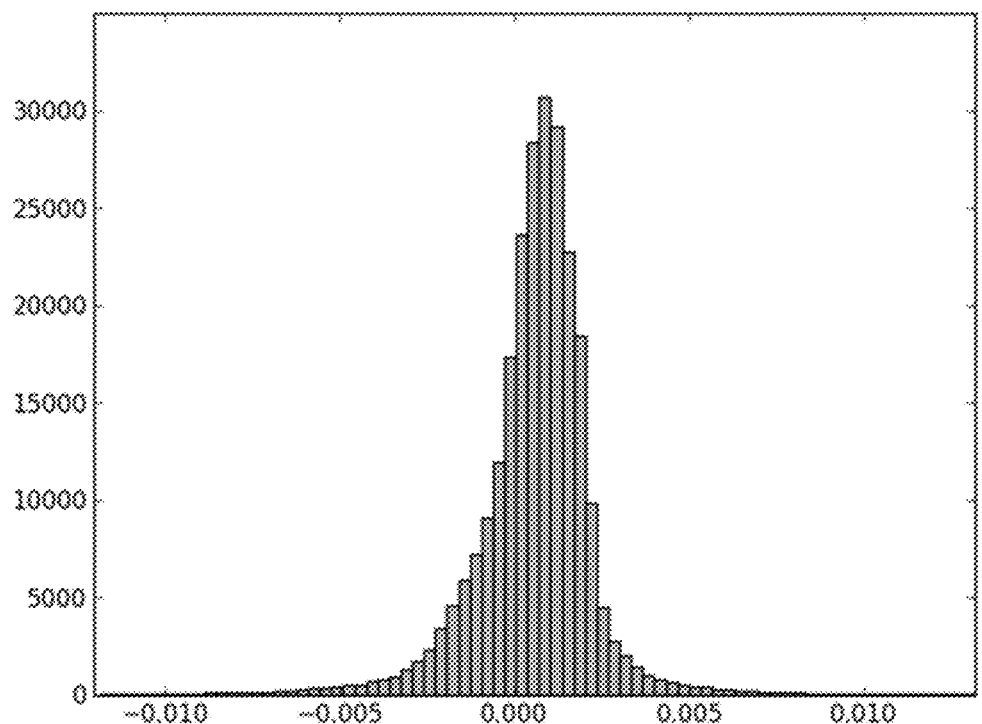
FIG. 8 depicts a histogram of relative deviations from the ground truth of a 3D point cloud corrected using a first tested strategy.
Figure 9:
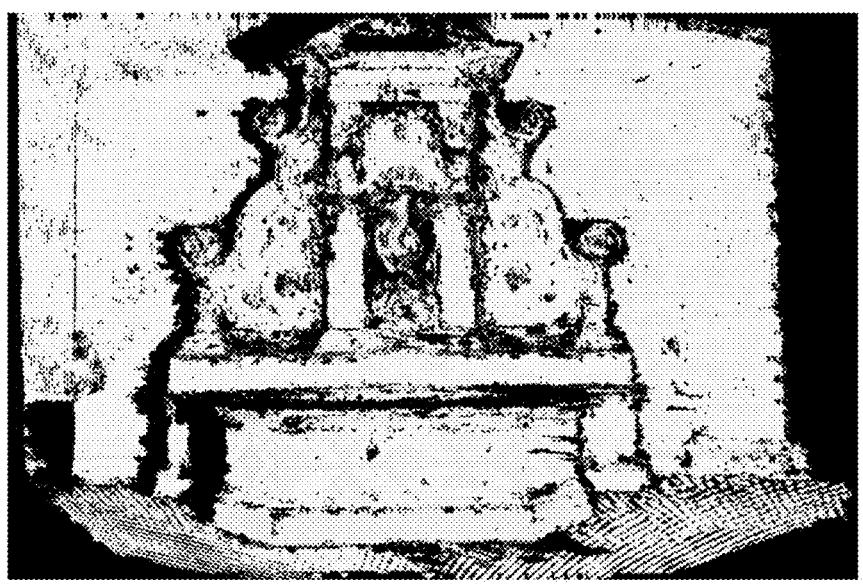
FIG. 9 shows remaining pixels and grayscale-encoded relative deviations from the ground truth for the first tested strategy.

Point clouds were compared with the ground truth following the approach by S. Shen mentioned in the background of the invention. For each pixel of the main view the 3D point was compared with the closest 3D point of the ground truth along the ray. In order to be able to compare the present results and those of S. Shen, the relative depth deviation $|D_{est} - D_{gt}|/|D_{gt}|$ was computed. Here, $D_{gt}$ is the true depth and $D_{est}$ the estimated depth. Depth estimates were considered to be erroneous when this deviation was larger than 1%. FIG. 6 shows a histogram of relative deviations (keeping the sign of the difference) of the estimated 3D point cloud from the ground truth. The comparison with the ground truth was performed for the original depth map. In FIG. 7, for each pixel this deviation is plotted in light gray for values not larger than 1%, where a lighter gray corresponds to a smaller relative deviation. Dark gray corresponds to pixels where the relative deviation is larger than 1%. Pixels which do not have a depth estimate or for which no ground truth depth exists are depicted in black as before. FIG. 8 and FIG. 9 show the histogram of relative deviations and the plotted deviation, respectively, for the point cloud corrected by the basic spatial consistency based rejection strategy with $\delta_{dist}$=0.015 m.

Quality indicators of interest are the standard deviation of the deviation histograms, the percentage of error pixels, and the number of surviving pixels.

Five different settings were considered. In the first one, only a distance threshold $\delta_{dist}$=0.015 m was introduced. The rejection threshold $\delta_{bad}$=0 was chosen, so a depth estimate was rejected when a single "bad" flag occurred, and $\delta_{good}$=1, so it was also rejected when the comparison with both side stereo frames yielded "undecided", but the pixel was kept if one side view signaled "occlusion" and the other one signaled "good". In the second one, an "occluded" flag was additionally changed to "bad" if the distance was below the error threshold introduced above with Δd=0.5. In the third setting an additional intensity test with an intensity threshold $\delta_{int}$=15 was used. The fourth setting made use of a corrected intensity threshold $\delta_{int}$=12. The window size of the median filter was 11×11. Finally, the fifth setting used the normalized cross-correlation test with an NCC threshold $\delta_{NCC}$=0.5 and a window size of 8×8.

The results are summarized in Table 1. The percentage of error pixels was computed with respect to the number of surviving pixels for which a ground truth depth estimate existed. This number was typically slightly smaller than the one given in the rightmost column. For the NCC based tests adaptive support weight windows were used. The parameters for the secondary tests were chosen such that the survival rate for the three strategies with secondary tests were comparable.

TABLE 1

Performance indicators of the different approaches.

| Strategy | Standard Deviation | Error pixels | Surviving pixels |
|---|---|---|---|
| Original 3D point cloud | 0.00629 | 9305 [2.95%] | 321187 [100%] |

TABLE 1-continued

Performance indicators of the different approaches.

| Strategy | Standard Deviation | Error pixels | Surviving pixels |
|---|---|---|---|
| Distance threshold $\delta_{dist}$ = 0.015 m | 0.00252 | 2235 [0.88%] | 253471 [78.9%] |
| Distance threshold $\delta_{dist}$ = 0.015 m Second distance threshold for "occluded" pixels with $\Delta d$ = 0.5. | 0.00222 | 1247 [0.55%] | 225810 [70.3%] |
| Distance threshold $\delta_{dist}$ = 0.015 m Intensity threshold $\delta_{int}$ = 15 | 0.00243 | 1862 [0.77%] | 240751 [75.0%] |
| Distance threshold $\delta_{dist}$ = 0.015 m Corrected intensity threshold $\delta_{int}$ = 12 Median filter for window size 11 × 11 | 0.00242 | 1814 [0.75%] | 240506 [74.9%] |
| Distance threshold $\delta_{dist}$ = 0.015 m NCC threshold $\delta_{NCC}$ = 0.5 for window size 8 × 8 | 0.00242 | 1941 [0.81%] | 240893 [75.0%] |

Figure 10:
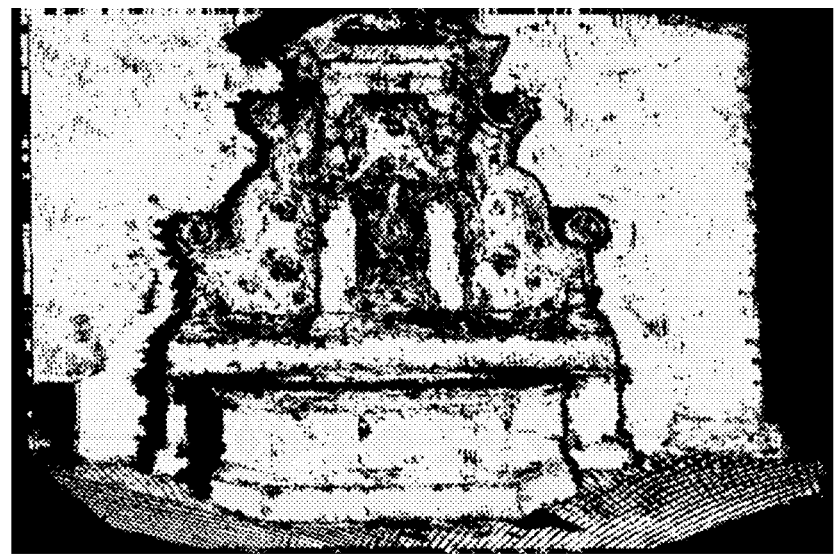
FIG. 10 depicts remaining pixels and grayscale-encoded relative deviations from the ground truth for a second tested strategy.
Figure 11:
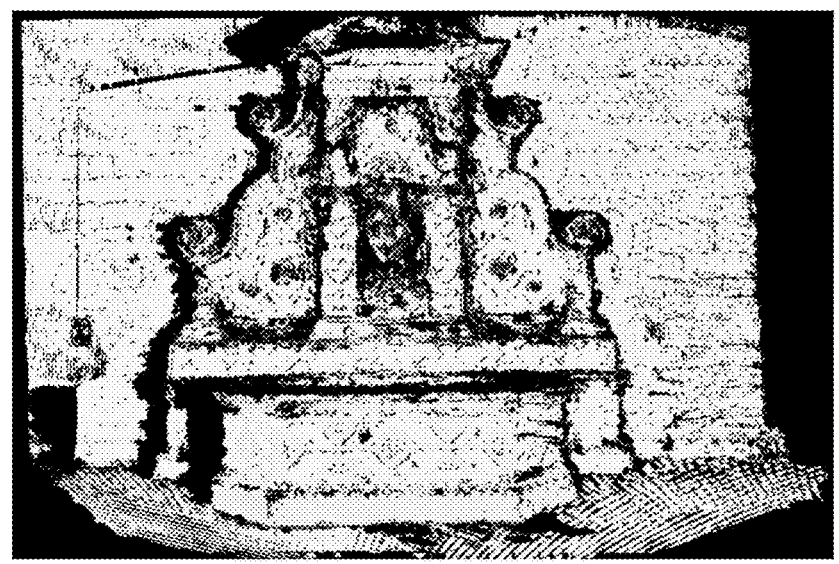
FIG. 11 shows remaining pixels and grayscale-encoded relative deviations from the ground truth for a third tested strategy.
Figure 12:
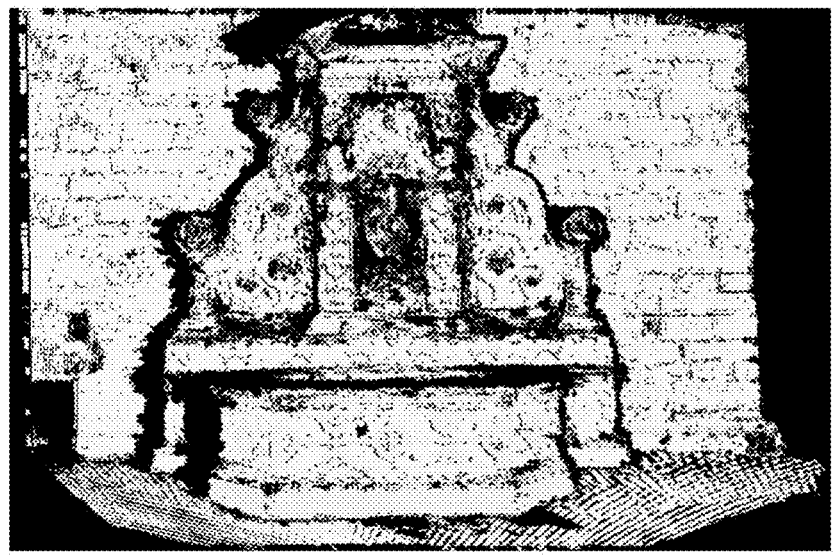
FIG. 12 depicts remaining pixels and grayscale-encoded relative deviations from the ground truth for a fourth tested strategy.
Figure 13:
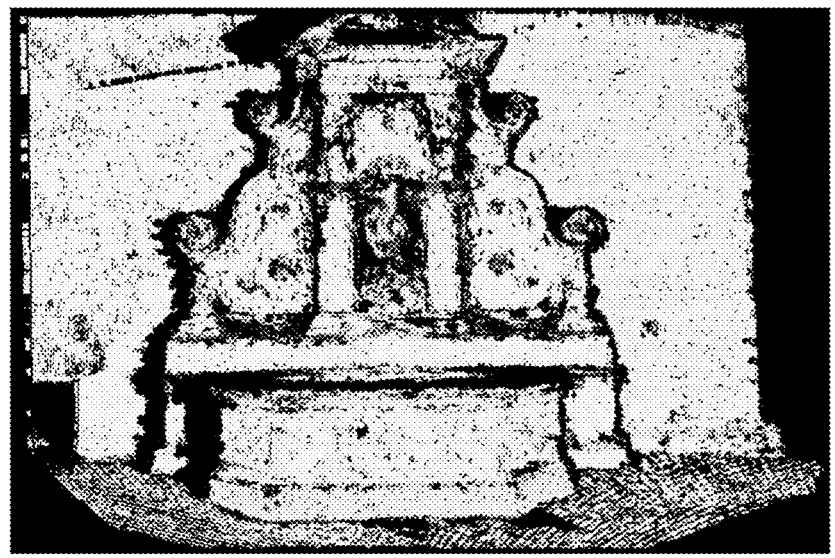
FIG. 13 shows remaining pixels and grayscale-encoded relative deviations from the ground truth for a fifth tested strategy.

The remaining pixels and grayscale-encoded relative deviations for the first strategy already mentioned above are shown in FIG. 9, i.e. the strategy based on spatial consistency only. FIG. 10 to FIG. 13 depict the remaining pixels and grayscale-encoded relative deviations from the ground truth for the remaining four tested strategies documented in Table 1. FIG. 10 visualizes the results of the second setting, namely the strategy based on spatial consistency and post-processing of occluded pixels. The results for the third setting, i.e. the strategy based on spatial consistency with an intensity based consistency check, are depicted in FIG. 11. FIG. 12 shows the results of the fourth setting, namely the strategy based on spatial consistency with an intensity based consistency check with luminosity correction. Finally, FIG. 13 depicts the results of the strategy based on spatial consistency with an NCC check.

All strategies using a secondary test succeeded in further reducing the fraction of error pixels. This is remarkable because the position of the camera center as well as the viewing direction changed significantly between the views. It can be observed that the main improvement comes from the implementation of the pure strategy without post-processing, but that the second distance criterion on the "occluded" pixels as well as the secondary tests help to further reduce the width of the histogram of the relative deviations as well as the percentage of error pixels. One may reduce this percentage even further by choosing more severe thresholds at the expense of keeping less pixels overall. This is interesting because in the scenario it is assumed that a very large number of views is available.

By inspecting the results in FIG. 11 to FIG. 13 one can draw further conclusions. Comparing the images with and without luminosity correction, it is apparent that the rejected pixels due to the tests with luminosity correction are distributed more evenly on the back wall. This is because the luminosity, especially of the right side, changes noticeably between the views. The NCC based test correctly keeps more of the fine structure on the fountain itself, which is well estimated (in light gray), for instance on the fish in the center. However, more pixels on the ground are falsely rejected. For the latter, this is probably caused by the fact that the floor is strongly slanted. It is possible to improve the performance by projecting the window used for the NCC computation from the main view into the neighboring view to take care of the slant.

Figure 14:
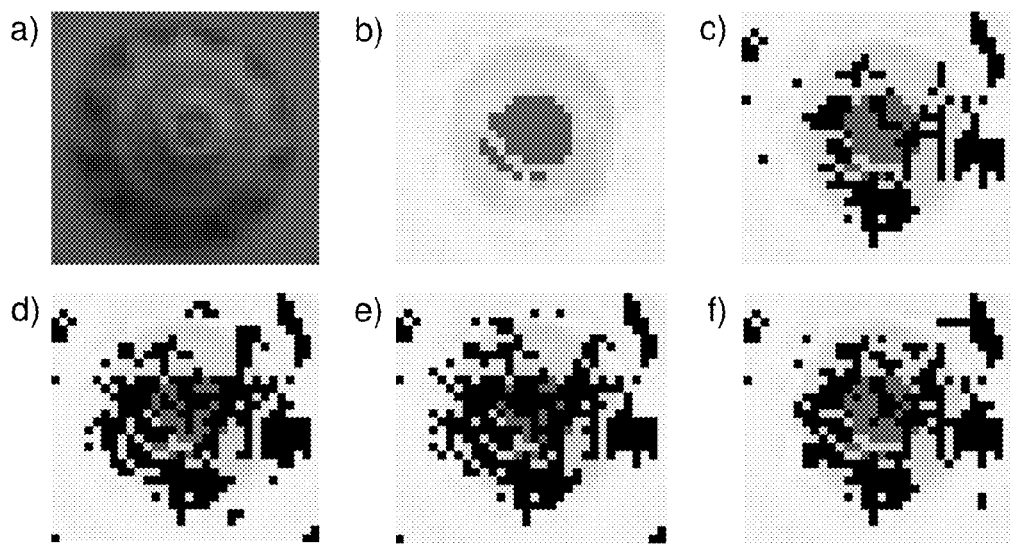
FIG. 14 illustrates the performance of the various approaches for a selected region of the left image of FIG. 5.

In FIG. 14, the performances of the different strategies are compared for the protruding ornament marked in FIG. 5a). Depicted are a detail of the image of FIG. 5a) (FIG. 14a)), a comparison of the original point cloud with the ground truth (FIG. 14b)), the result of the plain spatial consistency based strategy (FIG. 14c)), results of the strategy with intensity check (FIG. 14d)), results of the strategy with intensity check with luminosity correction (FIG. 14e)), and results of the strategy with NCC check (FIG. 14f)). Note that all secondary consistency checks help to reject bad pixels not detected by the spatial consistency checks. The test based on the intensity corrected by the luminosity seems to reject the most additional bad pixels in the center. However, the NCC based test rejects fewer well-estimated pixels on the plane from which the ornament protrudes.

The presented idea of additional tests could also provide information on unreliable depth estimates in a neighboring view. Consider the comparison of the main view with the neighboring view 2 in FIG. 1. If the distance between the 3D points $\vec{X}_m$ and $\vec{X}_2$ exceeds the bound $\delta_{dist}$, then this might be due to an occlusion. If, however, additional information such as intensities of the pixel pair agree very well, then this is an indication that $\vec{X}_m$ is a reliable point while the depth estimate at the pixel $\vec{p}_2$ is wrong in the neighboring view 2.

When a whole sequence of views is available, there are different options for cleaning the views. One option is to divide the sequence into distinct subsets. For each subset, a main view can be chosen, which is cleaned using the views of the subset as a neighborhood. Alternatively, a view may be used as a main view, but also as a neighboring view for the cleaning of a different view. For this case, two possible iterative strategies for the outlier removal shall be described.

Figure 15:
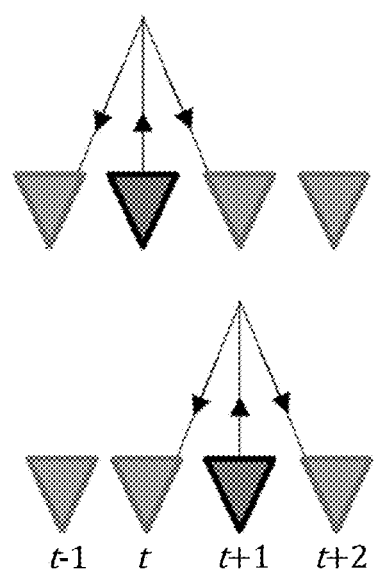
FIG. 15 depicts a sketch of an iterative strategy for outlier removal.

FIG. 15 depicts a sketch of an iterative strategy where the view captured at time step t is firstly cleaned itself and in the next step acts as a neighboring view. For example, the views could stem from a stereo-camera sequence where the camera moves from left to right. The time steps are indicated below the views.

If the whole sequence is available offline, one can proceed as follows. In the first step, each view is cleaned using its neighborhood. In a second step, the initial views without removed outliers are cleaned once again, but now comparing to the cleaned neighboring views. In this way, only reliable neighboring information is used for the outlier removal.

If one aims at cleaning each new view directly online during the capture then one could also clean in a sequential manner, adapting the previous strategy. Consider the case where the neighborhood of a view at time t comprises the views at time t−1 and t+1, cf. FIG. 8. Then at time t' a neighborhood exists for all the views up to the one captured at time step t'−1. Hence all views up to time step t'−1 could be cleaned online. Therefore, for all the views up to time step t'−2, a cleaned neighborhood exists, and these views could be cleaned using the cleaned neighboring views as in the first approach, but online.

Note that in both cases, a "bad" flag or a "good" flag from a neighboring view may turn to "undecided" after the view has been cleaned.

Figure 16:
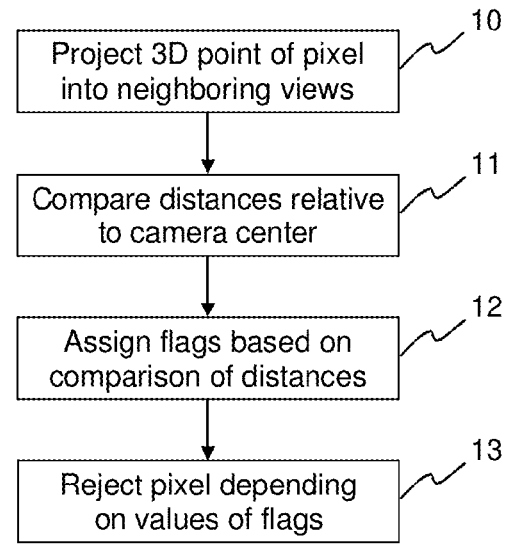
FIG. 16 schematically illustrates a method according to an embodiment of the invention for removing outliers from a main view of a scene during 3D reconstruction of a scene from multiple views of the scene.

FIG. 16 schematically illustrates one embodiment of a method for removing outliers from a main view of a scene during 3D reconstruction of a scene from multiple views of the scene. In a first step a 3D point of a pixel of the main view is projected 10 into neighboring views. Then the distance of each of the projected 3D points in the neighboring views to the 3D point of the main view is compared 11 with a defined distance threshold. Based on this comparison, flags are assigned 12 to the pixel in the main view. Depending on values of the flags the pixel in the main view is rejected 13 as an outlier.

Figure 17:
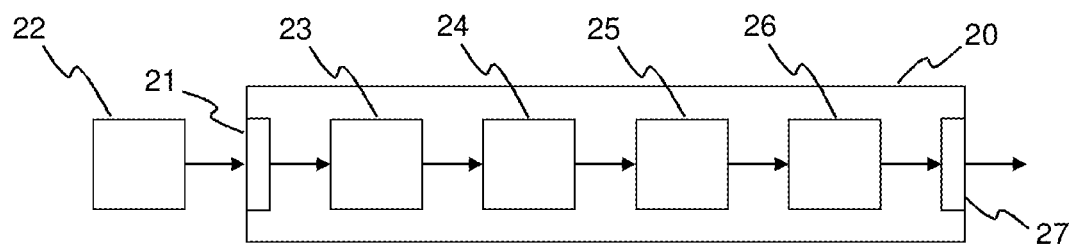
FIG. 17 schematically depicts a first embodiment of an apparatus configured to perform a method according to the invention.

One embodiment of an apparatus 20 configured to perform the method according to the invention is schematically depicted in FIG. 17. The apparatus 20 has an input 21 for receiving multiple views of a scene, e.g. from a network (not shown) or a storage unit 22. A 3D projection unit 23 projects 10 a 3D point of a pixel of the main view into neighboring views. A comparator 24 then compares 11 the distance of each of the projected 3D points in the neighboring views to the 3D point of the main view with a defined distance threshold. Based on the comparison, a flagging unit 25 assigns 12 flags to the pixel in the main view. Finally, depending on values of the flags, a rejecting unit 26 rejects 13 the pixel in the main view as an outlier. The result obtained by the rejecting unit 26 is preferably made available via an output 27. The output 27 may also be combined with the input 21 into a single bidirectional interface. Of course, the different units 23, 24, 25, 26 may likewise be fully or partially combined into a single unit or implemented as software running on a processor.

Figure 18:
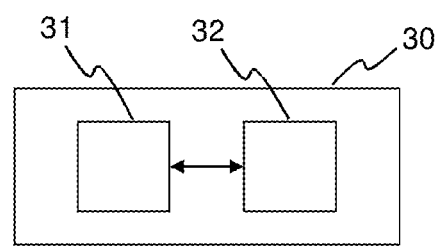
FIG. 18 schematically illustrates a second embodiment of an apparatus configured to perform a method according to the invention.

Another embodiment of an apparatus 30 configured to perform the method according to the invention is schematically illustrated in FIG. 18. The apparatus 30 comprises a processing device 31 and a memory device 32 storing instructions that, when executed, cause the apparatus to perform steps according to one of the described methods.

For example, the processing device 31 can be a processor adapted to perform the steps according to one of the described methods. In an embodiment said adaptation comprises that the processor is configured, e.g. programmed, to perform steps according to one of the described methods.

The invention claimed is:

1. A method for removing outliers from a main view of a scene during 3D reconstruction of a scene from multiple views of the scene, the method comprising:
projecting a 3D point of a pixel of the main view into neighboring views;
comparing the distance of each of the projected 3D points in the neighboring views to the 3D point of the main view with a defined distance threshold;
assigning flags to the pixel in the main view based on this comparison; and
rejecting the pixel in the main view as an outlier depending on values of the flags.

2. The method according to claim 1, wherein:
a flag with a first value is assigned when the 3D point in the main view and a projected 3D point in a neighboring view are in agreement;
a flag with a second value is assigned when a conflict exists between the 3D point in the main view and a projected 3D point in a neighboring view; and
a flag with a third value is assigned when a result of the comparison is undecided for a projected 3D point in a neighboring view.

3. The method according to claim 2, wherein a 3D point in a neighboring view is in agreement with the 3D point of the main view if their distance is below the defined distance threshold.

4. The method according to claim 2, wherein the flag with the third value is assigned when:
no depth information is available for a pixel in a neighboring view hit by projecting the 3D point of the pixel of the main view;
projecting the 3D point of the pixel of the main view into a neighboring view does not hit the neighboring view; or
a distance larger than the defined distance threshold might be due to an occlusion.

5. The method according to claim 2, wherein the flag with the third value is changed to a flag with the second value when the distance between the 3D point of a neighboring view and the 3D point of the main view is above the defined distance threshold but below a sum of depth errors of the pixel in the main view and the pixel in the neighboring view hit by projecting the 3D point of the pixel of the main view.

6. The method according to claim 2, wherein the pixel in the main view is rejected as an outlier if the number of flags with the second value is above a conflict threshold or if the number of flags with the first value is below an agreement threshold.

7. The method according to claim 2, further comprising:
performing an additional consistency check when a flag with the first value is assigned to the pixel; and
changing the flag with the first value to a flag with the second value when the additional consistency check fails.

8. The method according to claim 7, wherein the additional consistency check compares a property of the pixel in the main view and a property of the pixel in the neighboring view hit by projecting the 3D point of the pixel of the main view.

9. The method according to claim 8, wherein the additional property of a pixel is one of an intensity, a color, an intensity averaged for a window around the pixel, and a color averaged for a window around the pixel.

10. The method according to claim 7, wherein the additional consistency check uses a normalized cross-correlation between a window centered at the pixel in the main view and a window centered at the pixel in the neighboring view hit by projecting the 3D point of the pixel of the main view.

11. The method according to claim 1, wherein in case of a sequence of views:
the sequence is divided into distinct subsets, wherein for each subset one view is selected as a main view, whereas the remaining views are selected as neighboring views; or
a view of the sequence serves as a main view, but also as a neighboring view for another view of the sequence.

12. A non-transitory computer readable storage medium having stored therein instructions enabling removing outliers from a main view of a scene during 3D reconstruction of a scene from multiple views of the scene, which, when executed by a computer, cause the computer to:
project a 3D point of a pixel of the main view into neighboring views;
compare the distance of each of the projected 3D points in the neighboring views to the 3D point of the main view with a defined distance threshold;
assign flags to the pixel in the main view based on the comparison; and reject the pixel in the main view as an outlier depending on values of the flags.

13. The non-transitory computer readable storage medium according to claim 12, wherein the instructions cause the computer to:
assign a flag with a first value when the 3D point in the main view and a projected 3D point in a neighboring view are in agreement;
assign a flag with a second value when a conflict exists between the 3D point in the main view and a projected 3D point in a neighboring view; and
assign a flag with a third value when a result of the comparison is undecided for a projected 3D point in a neighboring view.

14. The non-transitory computer readable storage medium according to claim 13, wherein a 3D point in a neighboring view is in agreement with the 3D point of the main view if their distance is below the defined distance threshold.

15. The non-transitory computer readable storage medium according to claim 13, wherein the instructions cause the computer to assign the flag with the third value when:
no depth information is available for a pixel in a neighboring view hit by projecting the 3D point of the pixel of the main view;
projecting the 3D point of the pixel of the main view into a neighboring view does not hit the neighboring view; or
a distance larger than the defined distance threshold might be due to an occlusion.

16. The non-transitory computer readable storage medium according to claim 13, wherein the instructions cause the computer to change the flag with the third value to a flag with the second value when the distance between the 3D point of a neighboring view and the 3D point of the main view is above the defined distance threshold but below a sum of depth errors of the pixel in the main view and the pixel in the neighboring view hit by projecting the 3D point of the pixel of the main view.

17. The non-transitory computer readable storage medium according to claim 13, wherein the instructions cause the computer to reject the pixel in the main view as an outlier if the number of flags with the second value is above a conflict threshold or if the number of flags with the first value is below an agreement threshold.

18. The non-transitory computer readable storage medium according to claim 13, wherein the instructions further cause the computer to:
perform an additional consistency check when a flag with the first value is assigned to the pixel; and
change the flag with the first value to a flag with the second value when the additional consistency check fails.

19. The non-transitory computer readable storage medium according to claim 18, wherein the additional consistency check compares a property of the pixel in the main view and a property of the pixel in the neighboring view hit by projecting the 3D point of the pixel of the main view.

20. The non-transitory computer readable storage medium according to claim 19, wherein the additional property of a pixel is one of an intensity, a color, an intensity averaged for a window around the pixel, and a color averaged for a window around the pixel.

21. The non-transitory computer readable storage medium according to claim 18, wherein the additional consistency check uses a normalized cross-correlation between a window centered at the pixel in the main view and a window centered at the pixel in the neighboring view hit by projecting the 3D point of the pixel of the main view.

22. The non-transitory computer readable storage medium according to claim 12, wherein in case of a sequence of views:
the sequence is divided into distinct subsets, wherein for each subset one view is selected as a main view, whereas the remaining views are selected as neighboring views; or
a view of the sequence serves as a main view, but also as a neighboring view for another view of the sequence.

23. An apparatus configured to remove outliers from a main view of a scene during 3D reconstruction of a scene from multiple views of the scene, the apparatus comprising:
a 3D projection unit configured to project a 3D point of a pixel of the main view into neighboring views;
a comparator configured to compare the distance of each of the projected 3D points in the neighboring views to the 3D point of the main view with a defined distance threshold;
a flagging unit configured to assign flags to the pixel in the main view based on the comparison; and
a rejecting unit configured to reject the pixel in the main view as an outlier depending on values of the flags.

24. The apparatus according to claim 23, wherein the flagging unit is configured to:
assign a flag with a first value when the 3D point in the main view and a projected 3D point in a neighboring view are in agreement;
assign a flag with a second value when a conflict exists between the 3D point in the main view and a projected 3D point in a neighboring view; and
assign a flag with a third value when a result of the comparison is undecided for a projected 3D point in a neighboring view.

25. The apparatus according to claim 24, wherein a 3D point in a neighboring view is in agreement with the 3D point of the main view if their distance is below the defined distance threshold.

26. The apparatus according to claim 24, wherein the flagging unit is configured to assign the flag with the third value when:
no depth information is available for a pixel in a neighboring view hit by projecting the 3D point of the pixel of the main view;
projecting the 3D point of the pixel of the main view into a neighboring view does not hit the neighboring view; or
a distance larger than the defined distance threshold might be due to an occlusion.

27. The apparatus according to claim 24, wherein the flagging unit is configured to change the flag with the third value to a flag with the second value when the distance between the 3D point of a neighboring view and the 3D point of the main view is above the defined distance threshold but below a sum of depth errors of the pixel in the main view and the pixel in the neighboring view hit by projecting the 3D point of the pixel of the main view.

28. The apparatus according to claim 24, wherein the rejecting unit is configured to reject the pixel in the main view as an outlier if the number of flags with the second value is above a conflict threshold or if the number of flags with the first value is below an agreement threshold.

29. The apparatus according to claim 24, wherein the flagging unit is further configured to:
perform an additional consistency check when a flag with the first value is assigned to the pixel; and change the flag with the first value to a flag with the second value when the additional consistency check fails.

30. The apparatus according to claim 29, wherein the additional consistency check compares a property of the pixel in the main view and a property of the pixel in the neighboring view hit by projecting the 3D point of the pixel of the main view.

31. The apparatus according to claim 30, wherein the additional property of a pixel is one of an intensity, a color, an intensity averaged for a window around the pixel, and a color averaged for a window around the pixel.

32. The apparatus according to claim 29, wherein the additional consistency check uses a normalized cross-correlation between a window centered at the pixel in the main view and a window centered at the pixel in the neighboring view hit by projecting the 3D point of the pixel of the main view.

33. The apparatus according to claim 23, wherein in case of a sequence of views:
the sequence is divided into distinct subsets, wherein for each subset one view is selected as a main view, whereas the remaining views are selected as neighboring views; or
a view of the sequence serves as a main view, but also as a neighboring view for another view of the sequence.

34. An apparatus configured to remove outliers from a main view of a scene during 3D reconstruction of a scene from multiple views of the scene, the apparatus comprising a processing device and a memory device having stored therein instructions, which, when executed by the processing device, cause the apparatus to:
project a 3D point of a pixel of the main view into neighboring views;
compare the distance of each of the projected 3D points in the neighboring views to the 3D point of the main view with a defined distance threshold;
assign flags to the pixel in the main view based on the comparison; and
reject the pixel in the main view as an outlier in depending on values of the flags.

35. The apparatus according to claim 34, wherein the instructions cause the processing device to:
assign a flag with a first value when the 3D point in the main view and a projected 3D point in a neighboring view are in agreement;
assign a flag with a second value when a conflict exists between the 3D point in the main view and a projected 3D point in a neighboring view; and
assign a flag with a third value when a result of the comparison is undecided for a projected 3D point in a neighboring view.

36. The apparatus according to claim 35, wherein a 3D point in a neighboring view is in agreement with the 3D point of the main view if their distance is below the defined distance threshold.

37. The apparatus according to claim 35, wherein the instructions cause the processing device to assign the flag with the third value when:
no depth information is available for a pixel in a neighboring view hit by projecting the 3D point of the pixel of the main view;
projecting the 3D point of the pixel of the main view into a neighboring view does not hit the neighboring view; or
a distance larger than the defined distance threshold might be due to an occlusion.

38. The apparatus according to claim 35, wherein the instructions cause the processing device to change the flag with the third value to a flag with the second value when the distance between the 3D point of a neighboring view and the 3D point of the main view is above the defined distance threshold but below a sum of depth errors of the pixel in the main view and the pixel in the neighboring view hit by projecting the 3D point of the pixel of the main view.

39. The apparatus according to claim 35, wherein the instructions cause the processing device to reject the pixel in the main view as an outlier if the number of flags with the second value is above a conflict threshold or if the number of flags with the first value is below an agreement threshold.

40. The apparatus according to claim 35, wherein the instructions further cause the processing device to:
perform an additional consistency check when a flag with the first value is assigned to the pixel; and
change the flag with the first value to a flag with the second value when the additional consistency check fails.

41. The apparatus according to claim 40, wherein the additional consistency check compares a property of the pixel in the main view and a property of the pixel in the neighboring view hit by projecting the 3D point of the pixel of the main view.

42. The apparatus according to claim 41, wherein the additional property of a pixel is one of an intensity, a color, an intensity averaged for a window around the pixel, and a color averaged for a window around the pixel.

43. The apparatus according to claim 40, wherein the additional consistency check uses a normalized cross-correlation between a window centered at the pixel in the main view and a window centered at the pixel in the neighboring view hit by projecting the 3D point of the pixel of the main view.

44. The apparatus according to claim 34, wherein in case of a sequence of views:
the sequence is divided into distinct subsets, wherein for each subset one view is selected as a main view, whereas the remaining views are selected as neighboring views; or
a view of the sequence serves as a main view, but also as a neighboring view for another view of the sequence.

* * * * *